United States Patent
Kim

(10) Patent No.: US 7,817,195 B2
(45) Date of Patent: Oct. 19, 2010

(54) APPARATUS AND METHOD FOR AUTOMATIC CONVERSION TO DIGITAL ZOOM MODE

(75) Inventor: Hyung-Jun Kim, Daegu (KR)

(73) Assignee: Pantech Co., Ltd., Seoul (KR)

(*) Notice: Subject to any disclaimer, the term of this patent is extended or adjusted under 35 U.S.C. 154(b) by 598 days.

(21) Appl. No.: 11/375,266

(22) Filed: Mar. 13, 2006

(65) Prior Publication Data
US 2006/0290793 A1 Dec. 28, 2006

(30) Foreign Application Priority Data
Jun. 24, 2005 (KR) .................. 10-2005-0054798

(51) Int. Cl.
*H04N 5/262* (2006.01)
*H04N 5/225* (2006.01)
(52) U.S. Cl. .............................. 348/240.2; 348/333.11
(58) Field of Classification Search ............ 348/240.99, 348/240.2, 333.01, 333.11, 333.12, 208.6, 348/660, 663, 665, 298, 299, 698, 699
See application file for complete search history.

(56) References Cited

U.S. PATENT DOCUMENTS 7,362,966 B2* 4/2008 Uchiyama .............. 348/240.99

2003/0174220 A1* 9/2003 Ito .......................... 348/240.2
2004/0092284 A1* 5/2004 Satoh et al. ............... 455/550.1
2004/0259590 A1* 12/2004 Middleton ................ 455/556.1
2006/0170793 A1* 8/2006 Pasquarette et al. .... 348/240.99

FOREIGN PATENT DOCUMENTS

| JP | 2003-060982 | 2/2003 |
| KR | 1020040042569 A | 5/2004 |
| KR | 1020050033949 A | 4/2005 |
| KR | 10-2005-0041589 | 5/2005 |

\* cited by examiner

*Primary Examiner*—Jason Whipkey
(74) *Attorney, Agent, or Firm*—H.C. Park & Associates, PLC

(57) ABSTRACT

An apparatus and method of automatic conversion to a digital zoom mode allow a digital zoom to be executed by automatically converting from a high-resolution mode that does not support a digital zoom to a highest resolution mode supporting the digital zoom when a digital zoom key is pushed. The apparatus includes a key pad having a digital zoom key, a video processing unit for processing video data from the camera unit to determine a resolution and execute a digital zoom function, and a control unit for controlling the video processing unit to convert a resolution mode that does not support the digital zoom function to a highest resolution mode among resolution modes supporting the digital zoom function and execute the digital zoom function when the digital zoom key is pressed in the resolution mode that does not support the digital zoom function.

6 Claims, 2 Drawing Sheets

APPARATUS AND METHOD FOR AUTOMATIC CONVERSION TO DIGITAL ZOOM MODE

CROSS REFERENCE TO RELATED APPLICATION

This application claims priority from and the benefit of Korean Patent Application No. 10-2005-0054798, filed on Jun. 24, 2005, which is hereby incorporated by reference for all purposes as if fully set forth herein.

FIELD OF THE INVENTION

The present invention relates to an apparatus and method for automatic conversion to a digital zoom mode; and more particularly, to an apparatus and method of automatic conversion to a digital zoom mode that allows a digital zoom to be executed by automatically converting from a high-resolution mode that does not support such a digital zoom to a maximum resolution mode supporting the digital zoom when a digital zoom key is pushed.

DESCRIPTION OF THE RELATED ART

Presently, camera modules are incorporated in most of wireless communication terminals and many of them are provided with a digital zoom function. These wireless communication terminals can support various resolutions such as 320*240, 640*480, 1024*840, 1144*880, etc. When a user takes a picture using a camera provided in the wireless communication terminals, the user can preset a desired resolution of photo. For example, if the sizes of Liquid Crystal Displays (LCDs) of the wireless communication terminals are identical, the higher the resolution is preset, the higher the definition of photo is.

And also, the user can take a picture after enlarging a video inputted through a camera using a digital zoom function. Such a digital zoom function may provide a same effect as that of an optical zoom by processing a video signal inputted through a camera sensor by software. However, the more the video is enlarged using the zoom function, the more the resolution of the photo becomes lowered.

To be more specific, the resolution is not determined by controlling the video signal inputted from the camera sensor, but by the number of pixels of the signal when it is inputted and stored. And, the digital zoom function is to determine a part of the video signal inputted through the camera sensor to be displayed.

Therefore, if photographing is made by executing the digital zoom function in a mode that the resolution is set high, that is, a high-resolution mode, the video may be photographed with distortion. In other words, if the photographing is made in a low-resolution mode, for example, 320*240, the quality of the video is not affected when the digital zoom function is executed. However, if the photographing is made in the high-resolution mode, for example, 1120*840, with the digital zoom function, the video is scattered and thus a good quality of video cannot be obtained.

In order to prevent the video distortion phenomenon as described above, the prior art system is designed in such a way that the digital zoom function is blocked in the high-resolution mode. However, since the user actually wants the high-resolution mode in most cases, many cameras are set in the high-resolution. Accordingly, it is impossible to execute the digital zoom function despite of a user's selection thereof in the high-resolution mode. In addition, when the user wishes to execute the digital zoom function nevertheless, the user first enters the camera set mode to lower the resolution and then reenters the photographing mode, thereby making the user inconvenient.

SUMMARY OF THE INVENTION

It is, therefore, an object of the present invention to provide an apparatus and method of automatic conversion to a digital zoom mode that allows a digital zoom to be executed by automatically converting to a maxim resolution mode that supports the digital zoom when a digital zoom key is pushed, in a high-resolution mode that a wireless communication terminal does not support such a digital zoom.

In accordance with an aspect of the present invention, there is provided an apparatus for automatic conversion to a digital zoom mode in a wireless communication terminal having a camera unit and display unit, the apparatus including: a key pad having a digital zoom key; a video processing unit for processing video data transmitted from the camera unit to determine a resolution and execute a digital zoom function; and a control unit for controlling the video processing unit to convert a resolution mode that does not support the digital zoom function to a highest resolution mode among resolution modes supporting the digital zoom function and then execute the digital zoom function when the digital zoom key is pressed in the resolution mode that does not support the digital zoom function.

In accordance with another aspect of the present invention, there is provided a method for automatic conversion to a digital zoom mode in a wireless communication terminal having a camera, the method including the steps of: receiving a signal when a digital zoom key is pressed in a photographing mode; judging whether or not a resolution mode set in the photographing mode supports a digital zoom function; and if it is judged that the resolution mode does't support the digital zoom function, converting the resolution mode to a highest resolution mode among resolution modes supporting the digital zoom function and then executing the digital zoom.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description in association with the accompanying drawings; and based on this, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
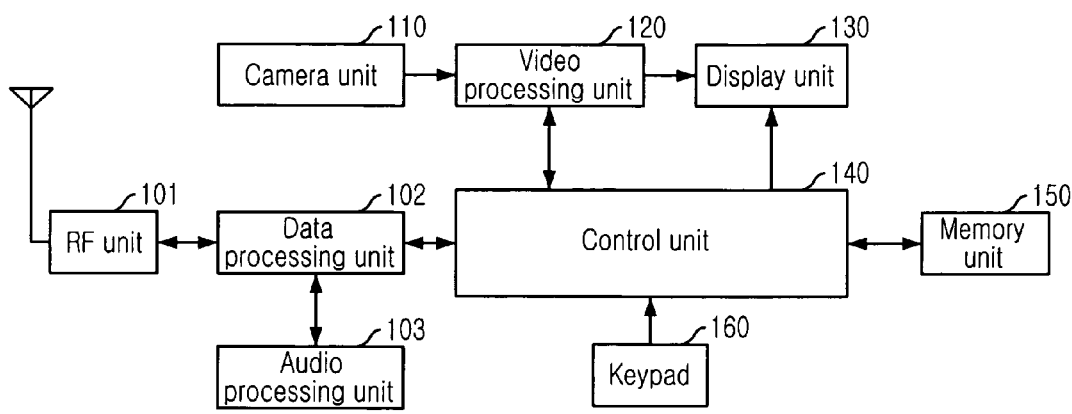
FIG. 1 provides an internal block diagram of a wireless communication terminal for automatic conversion to a digital zoom mode in accordance with an embodiment of the present invention.

FIG. 1 illustrates an internal block diagram of a wireless communication terminal for automatic conversion to a digital zoom mode in accordance with an embodiment of the present invention As shown in FIG. 1, an RF unit 101 carries out a wireless communication function of a wireless communication terminal. The RF unit 101 includes a RF transmitter for performing a high frequency modulation and an amplification with respect to a signal to be transmitted and a RF receiver for conducting a low frequency modulation and a low-noise amplification with respect to a received signal. A data processing unit 102 includes a transmitter for encoding and modulating the signal to be transmitted and a receiver for demodulating and decoding the received signal. The data processing unit 102 may be included in a control unit 140. Meanwhile, an audio processing unit 103 reproduces an audio signal transmitted from the data processing unit 102 or transmits an audio signal for transmission generated from a microphone (not shown) to the data processing unit 102.

Hereinafter, a description will be given with reference to FIG. 1 for an operation of the apparatus for automatic conversion to a digital zoom mode when a zoom key is pushed in a high-resolution mode that does not support the digital zoom in accordance with an embodiment of the present invention.

Specifically, a camera unit 110 photographs a video signal inputted via a lens. This camera unit 110 is provided with a camera sensor (not shown) for converting a photographed optical signal into an electrical signal and a signal processor (not shown) for converting the analog video signal converted by the sensor into digital data. The camera sensor may be a Charge Coupled Device (CCD) and the signal processor may be implemented by a Digital Signal Processor (DSP). The digital video data contains information on each pixel in the video signal converted by the camera sensor.

A video processing unit 120 receives the digital video data from the camera unit 110 and generates data to be displayed on a display unit 130. That is, the video processing unit 120 processes the digital video data transmitted from the camera unit 110 on a frame basis and outputs frame video data, which are adjusted to be fit to the characteristics and size of the display unit 130. The video processing unit 120 includes a video codec (not shown) and compresses the frame video data using a preset compression scheme or recovers original frame video data from the compressed frame video data. The image codec may be JPEG, MPEG4, Wavelet, or the like.

And also, the video processing unit 120 can determine a resolution by removing a part of the pixel data outputted from the camera unit 110 to display the data on the display unit 130, and also perform the digital zoom function by selecting and displaying a portion of an area on which the data is displayed. This function can be conducted through a scaler (not shown) embedded in the video processing unit 120, which reduces and crops the pixels of the video data provided from the camera unit 110 to the number of pixels that can be displayed on the display unit 130. Namely, once the resolution of the camera unit 110 is determined, the control unit 140 controls the scaler so that a video of a desired resolution can be displayed on the display unit 130.

The control unit 140 controls the overall wireless communication terminal system. To be more specific, the control unit 140 controls the video processing unit 120 to generate screen data having desired resolution. According to one embodiment of the present invention, when the zoom key in a keypad 160 is pushed in the high-resolution mode that does not support the digital zoom function, the control unit 140 controls the scaler in the video processing unit 120 so as to convert to a highest resolution mode supporting the digital zoom function and then execute the digital zoom function.

A memory unit 150 includes a program memory and a data memory. The program memory stores programs for controlling general operations of the wireless communication terminal. Particularly, the program memory stores programs for executing the digital zoom function according to the embodiment of the present invention as well as programs for converting the high-resolution mode that does not support the digital zoom function to the maximum resolution mode supporting the digital zoom function. Meanwhile, the data memory stores data generated during performing the programs and the photographed video data.

The display unit 130 displays the screen data generated at the video processing unit 120 and the data provided from the control unit 140. The display unit 130 may be an LCD; and, in this case, it may include an LCD controller (not shown), a memory (not shown) for storing the video data, an LCD display device (not shown) and so on.

In the meantime, the keypad 160 according to an embodiment of the present invention includes keys for inputting numerals and character information and various functional keys. Further, the functional keys include a key for setting the photographing mode as well as resolutions, a zoom key for executing the digital zoom, a photographing key, etc.

Now, an operation of the wireless communication terminal for automatic conversion to the digital zoom mode according to an embodiment of the present invention will be described below referring to FIG. 1. First of all, when the photographing mode commences, the video processing unit 120 processes the video data from the camera unit 110 in a preset resolution and outputs the same to the display unit 130.

When the zoom key is pressed through the keypad 160, the controller 140 judges whether or not the preset resolution is a resolution mode supporting the digital zoom function. If it is judged that the preset resolution mode does not support the digital zoom function, the controller 140 controls the video processing unit 120 to convert to the maximum resolution mode among resolution modes, which support the digital zoom function, and then execute the digital zoom function. However, if it is judged that the preset resolution mode supports the digital zoom function, the controller 140 controls the video processing unit 120 to execute the digital zoom function with respect to the digital video data from the camera unit 110. And, when the photographing key in the keypad 160 is pushed during a digital zoom execution picture is displayed on the display unit 130, an enlarged video is photographed and then stored in the memory unit 150.

Figure 2:
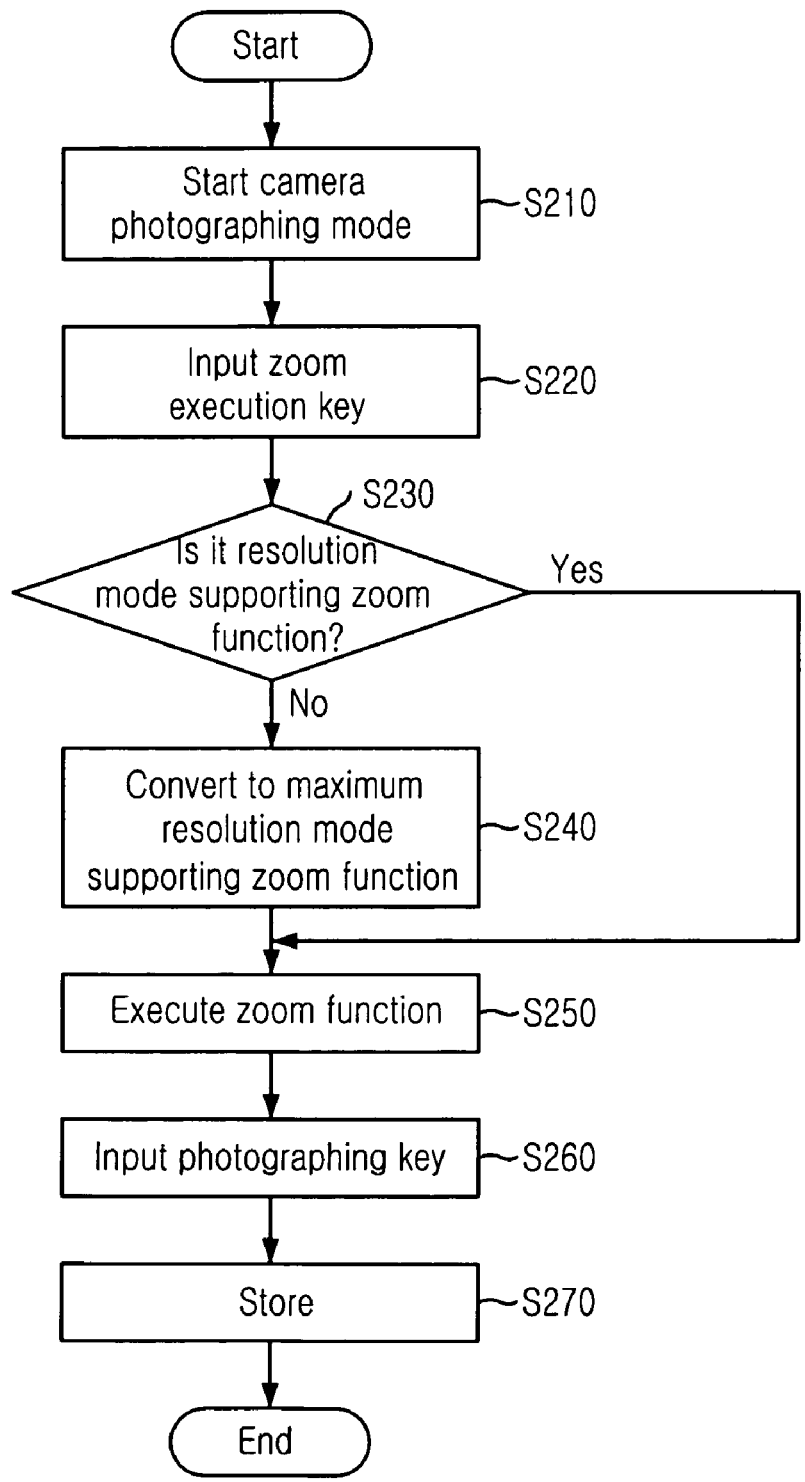
FIG. 2 illustrates a flowchart showing a method for automatic conversion to the digital zoom mode in accordance with an embodiment of the present invention.

FIG. 2 is a flowchart for describing a method for automatic conversion to a digital zoom mode in accordance with an embodiment of the present invention. Hereinafter, a method for automatically converting to the digital zoom mode when the zoom key is pushed in the high-resolution mode that does not support the digital zoom will be described referring to FIG. 2.

Firstly, a video to be photographed is displayed on the display unit 130 of the wireless communication terminal when the photographing mode initiates according to a user's manipulation at step S210.

When the user pushes the zoom key in order to enlarge a part of the video at step S220, the process of the invention judges at step S230 whether or not the preset mode is the resolution mode supporting the digital zoom function.

If it is judged that the preset mode is the resolution mode supporting the digital zoom function, the process executes the digital zoom to enlarge the part of the video and then display the enlarged part on the display unit 130 at step S250.

In the judgment, however, if the preset mode is the resolution mode that does not support the digital zoom function, the process converts the resolution mode to the highest resolution mode among the resolution modes preset to support the digital zoom function at step S240, and then executes the digital zoom function at step S250. Namely, differently from the conventional system that does not execute the zoom when the digital zoom key is pushed in the high-resolution mode that does not the digital zoom function, the present invention executes the digital zoom function after automatically converting the high-resolution mode to the maximum resolution mode supporting such zoom function.

Thereafter, when the photographing key is pressed at step S260, the process of the invention photographs the video enlarged by the digital zoom function and then stores it in the memory unit 150 at step S270.

The method of the present invention as described above may be implemented by a software program and stored in a computer-readable manner in a storage medium such as CD-ROM, RAM, ROM, floppy disk, hard disk, optical magnetic disk, or the like. This process may be readily carried out by those skilled in the art; and therefore, details of thereof are omitted here.

As set forth above, the present invention has an advantage in that the users can use a digital zoom function without resetting a camera resolution in a high-resolution mode that does not support the digital zoom function by automatically converting the high-resolution mode to a maximum resolution mode supporting the digital zoom function when a zoom key is pushed in the high-resolution mode and then executing the digital zoom function.

The present application contains subject matter related to Korean patent application No. 2005-0054798, filed with the Korean Intellectual Property Office on Jun. 24, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for automatic conversion to a digital zoom mode in a wireless communication terminal, comprising:
   a display unit to display video data;
   a camera unit to capture the video data;
   a key pad having a digital zoom key;
   a video processing unit to process the video data from the camera unit, to determine a current resolution mode of the video data, and to execute a digital zoom function;
   a control unit to determine whether the current resolution mode of the video data supports the digital zoom function, and if the current resolution mode is too high to support the digital zoom function, to convert the current resolution mode to a highest resolution mode among resolution modes supporting the digital zoom function upon executing the digital zoom function, where the highest resolution mode supporting the digital zoom function corresponds to a lower resolution than the current resolution mode; and
   a memory unit to store the video data at the highest resolution mode supporting the digital zoom function,
   wherein the video processing unit scales the video data received from the camera unit to the highest resolution mode among resolution modes supporting the digital zoom function if the control unit determines that the current resolution mode does not support the digital zoom function.

2. The apparatus as recited in claim 1, wherein the video processing unit determines the current resolution mode by removing a part of a plurality of pixel data from the video data transmitted from the camera unit and executes the digital zoom function by selecting a part of the plurality of pixel data.

3. The apparatus as recited in claim 1, wherein the key pad further comprises a photographing key to initiate the camera unit to capture the video data.

4. A method for automatically converting to a digital zoom mode in a wireless communication terminal, comprising:
   receiving a signal from a digital zoom key of a camera, the camera being in a photographing mode for capturing video data;
   judging whether a preset resolution mode for capturing the video data supports a digital zoom function;
   if the preset resolution mode does not support the digital zoom function, converting the preset resolution mode to a highest resolution mode among resolution modes supporting the digital zoom function upon executing the digital zoom function, capturing the video data, and scaling the captured video data to the highest resolution mode among resolution modes supporting the digital zoom function, where the highest resolution mode supporting the digital zoom function corresponds to a lower resolution than the preset resolution mode; and
   storing the captured and scaled video data.

5. The method as recited in claim 4, further comprising the step of:
   if the preset resolution mode supports the digital zoom function, executing the digital zoom.

6. The method as recited in claim 4, further comprising: photographing an enlarged video when a photographing key is pushed.

* * * * *